(12) United States Patent
Kyrazis

(10) Patent No.: US 7,777,866 B1
(45) Date of Patent: Aug. 17, 2010

(54) FIXED DIFFERENCE, DUAL BEAM LASER DOPPLER VELOCIMETRY

(76) Inventor: Demos T. Kyrazis, 1028 Tramway NE., Albuquerque, NM (US) 87122

( * ) Notice: Subject to any disclaimer, the term of this patent is extended or adjusted under 35 U.S.C. 154(b) by 92 days.

(21) Appl. No.: 11/828,250

(22) Filed: Jul. 25, 2007

Related U.S. Application Data

(60) Provisional application No. 60/820,312, filed on Jul. 25, 2006.

(51) Int. Cl.
 *G01P 3/36* (2006.01)
(52) U.S. Cl. ..................... 356/28.5
(58) Field of Classification Search ....... 356/3.01–3.15, 356/4.01–4.1, 5.01–5.15, 6–22
 See application file for complete search history.

(56) References Cited

U.S. PATENT DOCUMENTS

| | | | |
|---|---|---|---|
| 4,466,738 A * | 8/1984 | Huang et al. ............... 356/5.09 |
| 4,589,070 A | 5/1986 | Kyrazis |
| 4,595,287 A | 6/1986 | Edlin |
| 4,875,770 A | 10/1989 | Rogers et al. |
| 4,995,720 A | 2/1991 | Amzajerdian |
| 4,998,225 A | 3/1991 | Shajenko |
| 5,069,545 A | 12/1991 | Hinz |
| 5,088,808 A | 2/1992 | O'Meara |
| 5,088,815 A | 2/1992 | Garnier et al. |
| 5,164,784 A | 11/1992 | Waggoner |
| 5,276,453 A | 1/1994 | Heymsfield et al. |
| 5,317,376 A | 5/1994 | Amzajerdian et al. |
| 5,502,558 A | 3/1996 | Menders et al. |
| 5,552,879 A | 9/1996 | Takamiya et al. |
| 5,587,785 A | 12/1996 | Kato et al. |
| 5,610,705 A | 3/1997 | Brosnan et al. |
| 5,621,514 A | 4/1997 | Paranto et al. |
| 5,715,044 A * | 2/1998 | Hayes ....................... 356/5.09 |
| 5,724,125 A | 3/1998 | Ames |
| 5,748,295 A | 5/1998 | Farmer |
| 5,767,953 A * | 6/1998 | McEwan ................... 356/5.01 |
| 5,774,218 A | 6/1998 | Takamiya et al. |
| 5,796,471 A | 8/1998 | Wilkerson et al. |
| 5,815,250 A | 9/1998 | Thomson et al. |
| 5,831,720 A | 11/1998 | Ishida et al. |
| 5,838,439 A | 11/1998 | Zang et al. |
| 5,923,459 A | 7/1999 | Filipov et al. |
| 6,031,601 A * | 2/2000 | McCusker et al. ......... 356/5.01 |
| 6,078,384 A | 6/2000 | Dammann et al. |
| 6,100,965 A | 8/2000 | Nerin |
| 6,133,993 A | 10/2000 | Labaar |
| 6,170,795 B1 | 1/2001 | Wayne |
| 6,181,412 B1 | 1/2001 | Popescu et al. |
| 6,188,469 B1 | 2/2001 | Liou et al. |
| 6,301,968 B1 | 10/2001 | Maruyama et al. |
| 6,388,739 B1 | 5/2002 | Rice |
| 6,396,577 B1 | 5/2002 | Ramstack |
| 6,434,176 B1 | 8/2002 | Deck |
| 6,469,778 B2 | 10/2002 | Asaka et al. |
| 6,477,189 B1 | 11/2002 | Takeda et al. |
| 2001/0009458 A1 | 7/2001 | Asaka et al. |
| 2002/0071109 A1 | 6/2002 | Allen |

(Continued)

*Primary Examiner*—Thomas H Tarcza
*Assistant Examiner*—Luke D Ratcliffe
(74) *Attorney, Agent, or Firm*—Justin R. Jackson; Peacock Myers, P.C.

(57) ABSTRACT

A method and apparatus for laser Doppler velocity measurements with a fixed difference, dual beam receiver and using a non-laser, stable frequency reference.

19 Claims, 6 Drawing Sheets

U.S. PATENT DOCUMENTS

2006/0007423 A1* 1/2006 Guruprasad ............... 356/5.09
2006/0082758 A1* 4/2006 Nakamura et al. ......... 356/5.05
2007/0127009 A1* 6/2007 Chen et al. .................. 356/5.1

* cited by examiner

FIXED DIFFERENCE, DUAL BEAM LASER DOPPLER VELOCIMETRY

CROSS-REFERENCE TO RELATED APPLICATIONS

This application claims priority to and the benefit of the filing of U.S. Provisional Patent Application Ser. No. 60/820,312, filed Jul. 25, 2006, entitled "Fixed Difference, Dual Beam Laser Doppler Velocimetry" to Demos Kyrazis, and that application is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for laser Doppler velocity measurements.

2. Background Art

Note that the following discussion refers to a number of publications and that due to recent publication dates certain publications are not to be considered as prior art vis-a-vis the present invention. Discussion of such publications herein is given for more complete background and is not to be construed as an admission that such publications are prior art for patentability determination purposes.

As is well known, when there is relative motion along the line connecting the source and the receiver of energy propagating as a wave, the frequency of the received energy will be shifted from its original value. This change in frequency due to relative motion is known as the Doppler effect. This effect is readily observed with sound waves, and with electromagnetic waves such as radio waves and light waves.

For laser radars (LADAR) and other laser velocimetry devices, assuming that the receiver is collocated with the transmitter, the frequency of the received signal, $f_r$, is given by the following equation:

$$f_r = f_0 \pm \Delta f = f_0 \pm \frac{2v}{\lambda_0} = f_0\left(1 \pm \frac{2v}{c}\right) \quad (1)$$

where $\Delta f$=the change in laser frequency at the receiver. The (+) applies if the target is moving toward the receiver, and the (−) if the target is moving away.

v=the velocity component along the line of sight transmitter and target.

$\lambda_0$=the wavelength of the transmitted laser beam.

$f_0$=the frequency of the transmitted laser beam.

c=the velocity of light.

To determine the velocity component of the target point, it is only necessary to compare $f_r$ against $f_0$. A technique for doing this is to combine onto the surface of a photodetector, the received light from the target with the light from a laser local oscillator (LO). The LO beam is generally obtained by diverting a very small fraction of the transmitted laser energy. This process is called heterodyne detection, and the electrical output of the photodetector is the difference frequency between the two laser beams, i.e., $\Delta f$. The additional advantage of heterodyne detection is that the amplitude of the received signal is multiplied by the amplitude of the LO, thereby greatly enhancing the signal to noise ratio of the $\Delta f$ signal.

However, it takes time for light to travel from the transmitter to the target, and return to the receiver. Therefore, $f_r$ must be compared with the frequency, $f_0$, that existed when the transmitted wave was first generated, and not necessarily with the $f_0$ that might exist at the time the return signal was received. The difficulty in maintaining a stable local oscillator frequency, even over the very short propagation times of light, lies in the fact that the frequency difference detected is of the order of a few MHz, while the frequency of the light beam is 300 million times greater. This requires extreme mechanical stability of the laser oscillator, even when subjected to environmental effects such as mechanical vibration and thermal distortion.

The methods for solving this problem can be conveniently divided into four categories. For short ranges of a few tens to hundreds of meters, it is relatively easy to build a laser whose frequency drift lies within acceptable limits over the round trip time of the probe beam. For longer distance of involving hundreds of kilometers, it can still be done. However, in this case, the lasers tend to be large and complicated. They are difficult to align and maintain, and there is less freedom in the choice of laser that can be used. U.S. Pat. Nos. 5,796,471, 4,995,720, and 4,589,070 fall into this first category.

The second category involves the equalization of the optical path lengths of the probe beam and the laser LO beam. This technique is often used for applications such as wind tunnel measurements, where the delay can be produced by multiple reflections off of a set of mirrors. For longer ranges, up to several kilometers, a fiber optic coil can be used as the optical path equalizer as describe in U.S. Pat. No. 4,875,770.

A third category utilizes atomic vapor filters. These filters have very steep skirts. The transmission of a laser beam passing through such a filter is a very strong function of wavelength. Very small changes in wavelength produce large changes in the transmission. As a result, a measurement of the normalized transmission through the filter is a direct measurement of the wavelength change. U.S. Pat. Nos. 6,181,412 and 5,502,558 disclose interesting ways for making the measurement.

Finally, a fourth category is one in which the stable reference is something other than a laser. In U.S. Pat. No. 6,388,739, the objective is to measure vibration through the Doppler effect. The stable element, in this case a Mach-Zender interferometer, is part of a feedback element to determine the velocity of a mechanically vibrating object. U.S. Pat. No. 5,838,439 also involves vibration measurements, but the mixing of the return beam takes place within the laser cavity itself, instead of the surface of a photodetector. The advantage of this arrangement is that it is not subject to critical alignment problems. U.S. Pat. No. 5,552,879 utilizes a diffraction grating as the stable reference for determining the Doppler shift.

The present invention improves on the state of the art within this last category.

BRIEF SUMMARY OF THE INVENTION

An embodiment of the present invention relates to a fixed difference, dual beam process having a non-laser, stable frequency reference, to both a transmitter section and a receiver section of a fixed difference dual beam laser velocimetry system, wherein the frequency reference includes a first frequency; in the transmitter section, using the non-laser, stable frequency reference to split a laser beam into two outgoing laser beams that differ in frequency by at least substantially the first frequency; and in the receiver section, using the non-laser, stable frequency reference to control a demodulator output.

In one embodiment, the non-laser, stable frequency reference can have a radio frequency oscillator, a crystal oscillator, a temperature controlled crystal oscillator, and/or an atomic clock.

An embodiment of the present invention relates to a fixed difference, dual beam transmitter, having a laser source that generates a laser beam, one or more apparatuses for splitting the laser beam into two outgoing laser beams that differ in frequency and for directing the two outgoing laser beams to a target, with the two outgoing laser beams being generated under control of a stable frequency reference that also controls a demodulator output at a fixed difference, dual beam receiver that receives laser energy backscattered from the target.

In one embodiment, the one or more apparatuses for splitting the laser beam can have an acousto-optical apparatus, and the acousto-optical apparatus can include a Bragg cell.

The fixed difference, dual beam transmitter of claim 6 can also include one or more apparatuses for providing the laser beam as a local oscillator beam to a beam combining element of the fixed difference, dual beam receiver.

An embodiment of the present invention relates to a fixed difference, dual beam receiver, having optics configured to receive and concentrate laser energy backscattered from a target to provide an incoming laser beam, a beam combining element configured to co-align the incoming laser beam and a laser local oscillator (LO) beam, one or more apparatuses for mixing the incoming laser beam and a laser LO beam on a surface of a photodetector and to generate difference frequencies, one or more acoustical signal generating apparatuses configured to receive and process the difference frequencies to produce an acoustical signal in which an amplitude of a Doppler shifted acoustical frequency determined from the difference frequencies is multiplied by a function of an amplitude of the laser LO beam, and a frequency modulation (FM) receiver configured to receive and process the acoustical signal to generate a demodulator output signal.

In one embodiment of the fixed difference, dual beam receiver, the incoming laser beam and a LO beam can have substantially the same polarization. The one or more acoustical signal generating apparatuses can include a square law apparatus and the function of an amplitude of the laser LO beam can be the amplitude of the laser LO beam squared. The FM receiver can be configured to use a non-laser, stable frequency reference as a local oscillator input. The one or more apparatuses for mixing the incoming laser beam and a LO beam can include at least a portion of the photodetector itself.

An embodiment of the present invention also relates to a process that includes transmitting two laser beams to a target, the two laser beams differing in frequency by a substantially known and stable amount determined by a non-laser, stable frequency reference; and receiving and processing laser energy backscattered from the target to generate an acoustic signal providing Doppler measurement information pertaining to the target. The process can also include providing a local oscillator signal to a frequency modulation (FM) receiver that is derived from a stable reference to generate a demodulated output.

In one embodiment, the demodulated output comprises a voltage proportional the Doppler shifted acoustical frequency. The Doppler measurement information can be obtained using a video detection process. The video detection process can include aligning a return beam onto a photodetector surface to generate a signal having a frequency that is a Doppler shifted acoustical frequency. The Doppler measurement information can be obtained using a heterodyne detection process. The heterodyne detection process can include mixing a return beam and a LO beam on a photodetector surface to generate difference frequencies, and processing the difference frequencies with a squaring apparatus to generate a signal whose frequency is a Doppler shifted acoustical frequency.

For long range laser Doppler velocity measurements, it is difficult to maintain a stable laser reference frequency for comparison against the received, Doppler shifted signal. In the present invention, the frequency stability is transformed from the laser resonator to a stable crystal oscillator. In so doing, (1) lasers that previously could not be used for long range Doppler measurements can now be used; and (2) photon noise limited detection of the returned signal is possible using a laser local oscillator that is independent of the transmitted beam. The invention is also of a new technique for obtaining the velocity components at a point in space.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The following description of the present invention is divided into three parts: (1) Implementation of a stable reference for Doppler measurements; (2) Enabling simultaneous heterodyne detection and Doppler measurement; and (3) Measurement of the velocity components at a fixed point in space.

At radar wavelengths, the Doppler process is relatively easy to implement. The frequency reference can be a simple piezoelectric crystal, or the cavity of a magnetron. For a laser, the process is much more complicated in that the spacing of the mirrors for the laser resonator cavity has to be fixed to very high precision. Furthermore, the laser system is much more difficult to maintain, and is very susceptible to environmental effects such as temperature variations, accelerations, etc.

One normally describes light in terms of its wavelength. But it would be more convenient, in the discussion that follows, to describe light in terms of its frequency. For example, the frequency of the light generated by a 1.06 μm Nd:YAG laser is $2.83 \times 10^{14}$ Hz.

The fixed difference, dual beam technique of the present invention transforms the Doppler frequency shift measurement from optical frequency problem to a radio frequency problem. In so doing, the invention is able to take advantage of techniques and components used in radar and communications systems.

To understand how this may be accomplished, consider two laser beams with frequencies $f_0$ and $f_1$ respectively. Furthermore, let these two frequencies be related as follows:

$$f_1 = f_0 + f_a \quad (2)$$

One can allow $f_0$ to vary over time, but $f_a$ remains fixed. If both beams, $f_0$ and $f_1$, are sent out simultaneously, then each will be Doppler shifted by a different amount. If at the receiver, one takes the difference in frequency between the two received beams, one finds that this difference is equal to the Doppler shifted value of $f_a$. After simple manipulation of Eq. (1), the following formula is obtained:

$$\Delta f_a = \frac{2v}{c} f_a \quad (3)$$

In spite of the simplicity of Eq. (3), it has led to numerous applications in Doppler velocimetry. For example, in a radar application, it is used to resolve range-Doppler ambiguities (U.S. Pat. No. 5,276,453). In laser applications, it leads to techniques for measuring the velocity components near normal to the line of sight in wind tunnel tests.

Part 1. Implementation of a Stable Reference for Doppler Measurements

Figure 1:
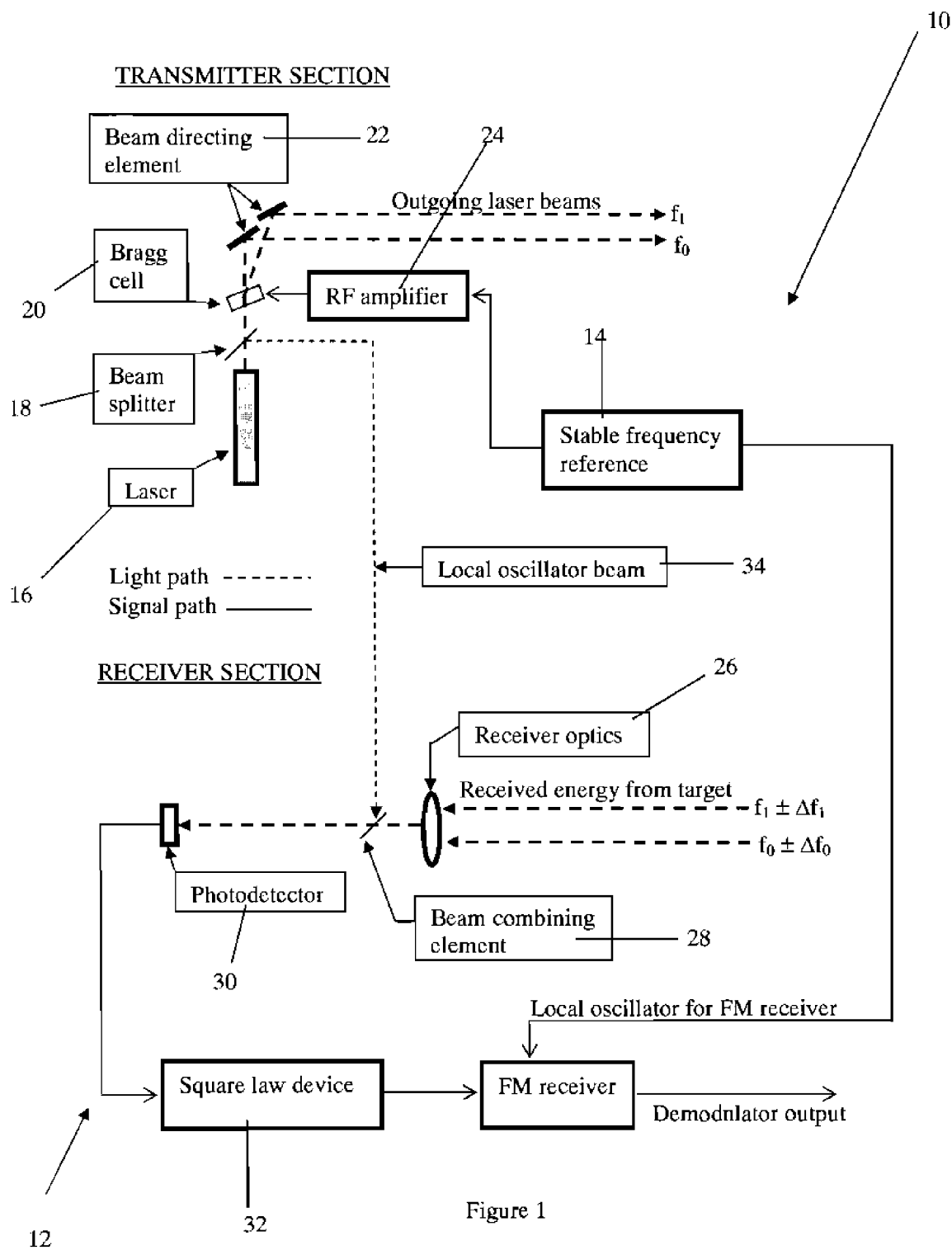
FIG. 1 is a block diagram illustrating an embodiment of the fixed difference, dual beam laser Doppler velocimetry system of the present invention.

Items for implementing the fixed difference, dual beam process are illustrated in FIG. 1. Two portions of an embodiment of the present invention comprise transmitter section 10 and receiver section 12. Common to both sections is stable frequency reference 14.

Stable frequency reference 14 preferably enables the determination of the Doppler shift imposed by a target on the received laser energy. This is most preferably implemented by an oven controlled crystal oscillator, such as an Agilent Technologies model HP 10811. This has the stability needed to resolve velocity changes as small as 0.5 meters/second, even over ranges exceeding hundreds of kilometers.

Stable frequency reference 14 is not usually at the frequency required for operation. In the device mentioned above, the output frequency is preferably 10 MHz. From this frequency, one synthesizes the actual frequency used in the system. Within this block, the invention includes the necessary circuitry to generate the actual frequency that will be used. The actual frequency will have the same stability as the fundamental reference. Note that the frequency generated by the transmitter section would be $f_a$, but for the receiver section it would be $f_a + 10.7$ MHz or $f_a - 10.7$ MHz. The 10.7 MHz frequency corresponds with the first intermediate frequency (IF) of the first IF amplifier in a standard FM receiver.

1.1 The Transmitter Section

In one embodiment, transmitter section 10 preferably comprises the following components: laser source 16, beam splitter 18, Bragg cell 20, stable frequency reference 14, and beam directing element 22.

Laser source 16 preferably provides the beam that is further processed by the rest of transmitter section 10. In a preferred embodiment, a laser is preferably provided which operates in a single mode. Such lasers are readily available commercially in a large variety of wavelengths. The laser power output is chosen for the anticipated use as will be recognized by those skilled in the art. if required, further amplification of the outgoing beam can be accomplished by adding a laser amplification stage after the beam combining mirrors.

An additional advantage of the present invention is that there is a great deal of flexibility in the choice and operation of the laser. This allows one to optimize the system for its intended use. For example, the laser could be operated in a pulse burst mode for applications described in U.S. Pat. No. 4,589,070. But it would not require a stable post pulse pedestal for making the Doppler measurement (U.S. Pat. Nos. 4,875,770 and 4,589,070).

The function of the beam splitter 18 is to divert a very small fraction of the laser beam for use in receiver section 12. Beam splitter 18 is not an essential element and desirable results can be obtained without it. Most preferably, beam splitter 18 is preferably used when very weak returns are obtained from the target. For strongly received signals, beam splitter 18 is preferably not used.

Bragg cell 20 preferably implements Eq. (2) and preferably comprises a transparent element within which a sound wave is generated. Typically, a piezoelectric crystal attached to the surface of a Bragg cell is the source of the sound wave. If such a Bragg cell is employed in accordance with the present invention, the driving source for the crystal is preferably stable frequency reference 14, its output is amplified by radio frequency (RF) amplifier 24 to the level needed to provided the correct acoustical power inside Bragg cell 20.

The frequency of the sound wave is equal to $f_a$, and preferably is between about 10 MHz and 600 MHz, and more preferably between about 50 MHz to about 200 MHz, depending on the particular design of the Bragg cell used. Known Bragg cells which provide desirable results for this embodiment of the present invention are readily available commercially.

Upon entering Bragg cell 20, the laser beam interacts with the sound wave in such a way that the laser energy is split into two beams. One of these beams is not deflected and continues on its path undisturbed. Its wavelength and thus its frequency, is not changed from that of the incoming beam. The other beam is deflected as a result of the interaction with the sound wave and its frequency is shifted by the amount $f_a$. Whether $f_a$, is added or subtracted from the original laser frequency is determined by the angle that the incoming beam makes with the direction of propagation of the sound wave. Under some circumstances, it could be desirable to insert a Bragg cell into the local oscillator beam path in order to shift its frequency in the opposite direction from that of the main beam. This would aid in simplifying the signal processing in receiver section 12.

When the laser beams leave Bragg cell 20, they preferably diverge over an angular range of a small fraction of one degree to about twelve degrees, and most preferably from less than about 1 degree to about 7 degrees, the actual amount depends on the wavelength of the laser, the speed of sound in the material, and the frequency of the sound wave. The purpose of the beam directing element is to assure that both beams occupy the same space at the target point. For long ranges, the beams only need to be parallel when they leave beam directing element 22, since diffraction spreading will assure that they will overlap at the target. For much shorter ranges, it could be more convenient to construct the beam directing element so that they intersect at a desired point in space.

1.2 The Receiver Section

In one embodiment, receiver section 12 preferably comprises receiver optics 26, beam combining element 28, photodetector, 30, square law device 32, and FM receiver 34.

Because transmitter 10 sends out two beams that are constrained by Eq. (2), allows one to make a Doppler measurement utilizing either video or heterodyne detection mode. By definition of the video mode, a local oscillator beam is not required to mix with the received beam on a surface of photodetector 30. The return beam is preferably brought onto photodetector 30 by receiver optics 26, and the electrical output of the photo detector is a signal whose frequency is the Doppler shifted acoustical frequency, i.e., $$f_{ar} = f_a + \Delta f_a \quad (4)$$

where $f_{ar}$ is the received, Doppler shifted acoustical frequency.

Video detection results in an enormous simplification of the optical train, and in the processing electronics that follows. The optical simplification results from not needing local oscillator beam 34 and beam combining element 28. In addition, the problems associated with maintaining correct alignment of the laser LO beam and the received beam are also avoided. Electronically, square law device 32 within receiver section 10 is eliminated.

The problem with video detection is that a fairly strong received laser beam must be seen by the photodetector. This is possible when the target is a strong reflector, and the range is not two great. For example, this would work for measuring the speed of an automobile by police. But video detection does not result in photon noise limited detection, which would be the physical limit of detection. Therefore, its use is questionable for such applications such as measurement of wind velocity in the atmosphere at long ranges, in which the returned energy is a result of back scattering from particulates and gas molecules in the air.

The use of heterodyne detection is necessary in order to obtain photon noise limited performance. If a Doppler shift measurement were not being made, then a normal laser LO could be used without concern about frequency stability. Conventional wisdom states that to simultaneously obtain photon noise limited performance and make a Doppler shift measurement, then one must use a sufficiently stable laser LO. However, with the present invention one can simultaneously obtain photon noise limited performance and make a Doppler measurement without requiring a stable laser LO. Part 2 explains how this is accomplished.

Receiving optics 26 preferably perform two functions. The first is to collect the laser energy backscattered from the target. The second is to concentrate the energy onto photodetector 30. This is a straightforward optical engineering problem, and the details of the design are application specific.

The purpose of beam combining element 28 is to align the laser LO beam with the incoming laser beam so as to enable heterodyne detection on a surface of photodetector 30. The power of the laser LO beam is typically one microwatt or less. Care must be taken to assure that the LO and the received beams have the same polarization, and that they are co-aligned on a surface of photodetector 30.

The photodetector 30 must have sufficient bandwidth to process the output electrical signal correctly. If video detection is used, only two frequencies are mixed at the surface which generates the sum and difference frequencies. Only the difference frequency would appear at the output, since the sum frequency would be in the optical frequency range and could not appear as an electronic signal. The difference frequency is the Doppler shifted acoustical frequency $f_{ar}$. The frequency bandwidth of the electronics need only be that needed to pass the full possible range of $f_{ar}$.

For video detection, square law device 32 is not required. It is shown in Part 2 that when heterodyne detection is being implemented square law device 32 will produce a signal going into FM receiver in which the amplitude of the Doppler shifted acoustical frequency is multiplied by the amplitude squared of the laser LO.

Square law device 32 preferably has the ability to square the input signal, performing the necessary electronic amplification, filtering the output so that the predominant signal going to the FM receiver is the Doppler-shifted acoustical frequency. The squaring operation can be accomplished with something as simple as a solid state diode, such as a Hewlett-Packard 5082-2800, or it can be a full fledged multiplier device. The input bandwidth, before the squaring operation takes place, is most preferably nearly 1 GHz. This bandwidth is chosen on the basis that the laser may mode hop during the velocity measurement process. The actual bandwidth required depends on the type of laser used and the resonator design. The above bandwidth was based on a HeNe laser using a quasi-hemispherical resonator.

After squaring the signal, one of the outputs would be the signal at the frequency $f_{ar}$, as well as other modulation products. A band pass filter centered at the frequency $f_a$ removes the unwanted modulation products.

The above process greatly increases the amplitude of the desired signal and at the same time translates it into the correct frequency range for the velocity measurement.

In the standard techniques for performing laser Doppler velocimetry, Fourier transform methods are generally used to determine the Doppler shifted frequency. This works very well when one is directly measuring the frequency change in the returned laser beam. If one used a Nd:YAG laser, a 1 meter/second (m/s) velocity change would result in 1.887 MHz frequency change. One would need only a few microseconds of signal in order to accurately determine the frequency shift, and the computation could be performed in less than a millisecond.

In contrast, it the original frequency, $f_a$ is 100 MHz, then the frequency change resulting from a 1 m/s velocity change would be 0.667 Hz. Therefore, the minimum time over which a change could be detected would be the period of the signal, or 1.5 seconds. However, the signal is corrupted by noise and it would be desirable to analyze at least 10 cycles of the signal. Therefore, one would need 15 seconds of data in order to obtain an accurate measurement of the velocity change using Fourier transform techniques.

An alternative way of considering the problem is to think of the frequency change as frequency modulation of the carrier frequency, $f_a$. In that case, a standard FM radio receiver can be used to detect the Doppler shift. FM receivers are available as a single chip. An example is the Motorola MC13135, which costs around $5.00.

The technique of using two laser beams whose frequency differs by a known and stable amount brings about a number of advantages. The first is that it enables a simple way of measuring the Doppler shift through the signal processing done by the FM receiver. The FM receiver converts a frequency change into an easily measured voltage change at its output. The second is that a fractional Hz change in frequency can be determined in a few milliseconds, or less, compared to 15 seconds needed using Fourier transform methods.

This technique has an additional advantage of providing increased signal to noise ratio (SNR) compared to making a direct measurement of the optical frequency shift, as is currently being done. The reason is that the signal bandwidth required to process the optical signal is about $4 \times 10^6$ times greater than that required to process the acoustic signal. The noise energy inherent in the measurement process is proportional to the square root of the limiting bandwidth of the system (usually the bandwidth of the RF amplifier). This results in a calculated increase in SNR of 66 dB because of the correspondingly narrower RF system bandwidth. The actual gain in SNR depends on the intended use, but is still significant.

Note that this gain in SNR is simply a result of being able to utilize a much narrower electronic bandwidth in making the Doppler measurement. As a consequence, a number of system advantages become evident:

1. The power of the laser transmitter can be significantly reduced.
2. Video detection could be used in place of heterodyne detection in many applications.
3. Heterodyne detection can be used with significantly increased system performance keeping other parameters constant.

Part 2. Enabling Simultaneous Heterodyne Detection and Doppler Measurement

One approach to solving the problem of laser LO drift during a Doppler shift measurement is to measure the change in LO frequency and correct for it. The correction can take one of two forms. The first is feedback to a laser cavity mirror so as to maintain the correct frequency. The other is to calculate the correct velocity based on the known drift. The use of the fixed difference, dual beam technique greatly simplifies the problem of Doppler velocimetry because simple electronic circuitry solves the measurement problem without imposing stringent laser oscillator requirements.

In the following discussion, the received laser beams will have amplitude 1 and the laser LO beam will have amplitude A. The subscript r will be dropped from the received frequencies for this part of the discussion. Note that when two sinusoids are multiplied together, the resultant product consists of two new sinusoids whose frequencies are the sum of the two original frequencies and the difference of the two original frequencies. Ignore the factors ½ and 2 that result from the squaring operation.

Case 1. Video Detection

In this case, the photodetector interacts with the two light beams to generate the square of the sum of the two beams, i.e., $(\cos 2\pi f_0 t + \cos 2\pi f_1 t)^2$. This produces three independent terms consisting of the squares of the individual sinusoids and the cross-product term. The summed frequencies are in the optical frequency range. Therefore they do not produce an electrical output. The squared terms generate a double frequency component and a zero frequency component. The cross-product term generates the difference frequency, $(f_1 - f_0)$, which is equal to $f_a$, the desired signal.

This signal is sufficient to be processed by the FM receiver, if it is strong enough to overcome the thermal noise of the photodetector and the rest of the electronic circuitry.

Case 2. Heterodyne Detection

The objection one could make to Case 1 is that a much weaker signal, limited only by photon noise, could be received if heterodyne detection is used. This significantly reduces the laser power, or the size of the collecting optics, needed for a given application. The argument is then made that this can only be done with a stable laser local oscillator.

It is now shown that when the fixed difference, dual beam technique is implemented, the frequency of the laser LO does not need to be precisely known. However, the LO frequency must be constrained within the design limits of the electronic circuitry that follows the photodetector. This allows for a reasonable amount of mode hopping within the laser.

Let $f_{LO}$ be the instantaneous frequency of the laser LO beam on the photodetector. This mixes with the two return signals, generating the following operation:

$$(\cos 2\pi f_0 t + \cos 2\pi f_1 t + A\cos 2\pi f_{LO} t)^2$$

which generates six independent products. The only ones of interest are the three cross-products generating the difference frequencies. These are a) $\cos 2\pi (f_1 - f_0)t$
b) $A \cos 2\pi (f_1 - f_{LO})t$
c) $A \cos 2\pi (f_0 - f_{LO})t$ The a) cross-product is the same as that produced by video detection, but b) and c) have both been multiplied by the amplitude of the laser LO. This is an important aspect of heterodyne detection. In the interactions that take place within the photodetector, the signal generated by the incoming beam is multiplied by the amplitude of the LO. This greatly enhances the effective sensitivity of the detection process.

Note that b) and c) show that both $f_0$ and $f_1$ have been shifted in frequency by the same amount, namely, by $f_{LO}$. This means that the difference between these two frequencies is still $f_d$. This difference between b) and c) can be obtained simply by multiplying the two together, since this generates the sum and difference frequencies. There are a number of ways that this can be done, but the simplest way is probably squaring these signals. This will then produce the desired signal $f_d$, and its amplitude will have been multiplied by $A^2$.

What has been demonstrated is that by using the two beam technique, one can simultaneously obtain the advantages of heterodyne detection and determine the Doppler shifted difference frequency without having to know the precise value of the LO frequency.

Part 3. Measurement of the Velocity Components at Fixed Points in Space

When a Doppler LADAR is used for the measurement of a wind field, the measured wind component at the point sampled in space is the component along the optical line of sight (LOS) of the LIDAR. As a result, at least two non-collinear measurements must be made in order to determine the wind vector in a plane, and three non-coplanar measurements are needed to determine all three components of the wind.

Figure 2:
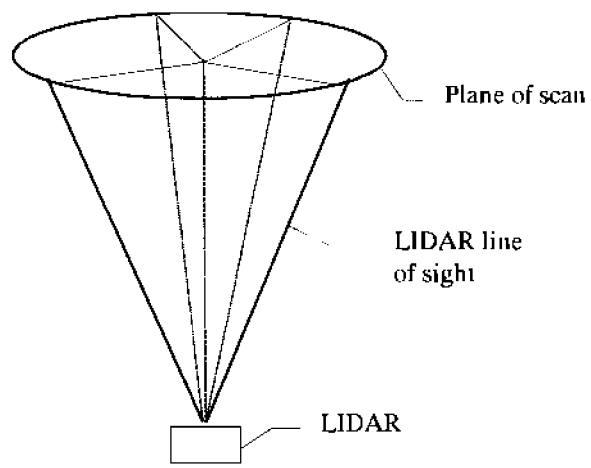
FIG. 2 is a drawing illustrating a VAD (velocity-azimuth display) scan.

For a single, stationary Doppler LIDAR, a scanning technique called VAD (velocity-azimuth display) is preferably used to determine the wind vector. The scan is illustrated in FIG. 2. The elevation angle and the selected range determine the plane of the scan. Four LOS's are shown. Note that with the VAD technique, the velocity vector cannot be determined at a single point, and one must assume no change in wind velocity over the area being scanned. A variation of the VAD technique is discussed in U.S. Pat. No. 5,724,125.

Obtaining two LOS's can be accomplished by using two fixed laser systems separated by a baseline distance. It is also possible to use a single transmitter, and a plurality of receivers synchronized to observe a given spatial point simultaneously. Each receiver is preferably capable of heterodyne detection since the laser LO source can be different than the transmitter source.

Alternatively, a single unit can be transported along the baseline with the transmitted beam pointing at a fixed spatial point. This approach allows one to use an aircraft, or some other vehicle, to rapidly obtain wind field measurements.

Figure 3:
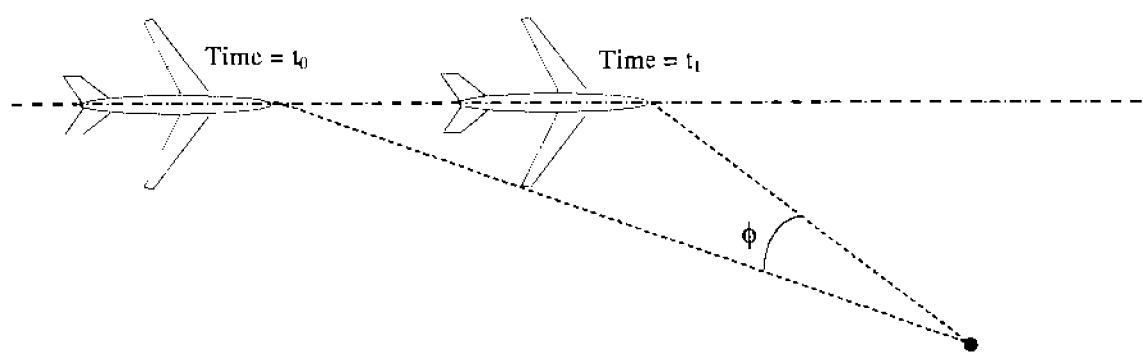
FIG. 3 is a drawing illustrating the use of aircraft motion to measure the wind vector at a fixed point in space.

In an aircraft, one can take advantage of the aircraft motion to determine the wind vector at fixed points in space. Utilizing GPS and an inertial platform, one can designate the points in space to be sampled by pointing the LADAR beam in the desired direction and setting the range gate of the receiver. FIG. 3 illustrates an aircraft sampling the wind at a fixed point in space at times $t_0$ and $t_1$; for simplicity, assume that the airplane and the sampled point are in a horizontal plane. Otherwise, correct the velocity measured at each LOS by dividing the LOS velocity by the cosine of the angle that the LOS makes with the horizontal plane.

The speed and precision of modern gimbal systems makes it possible to quickly scan a large number of points within a large spatial volume while at the first location at time, $t_1$. Then the same points can be scanned while at the second location at the time, $t_2$. One can then construct an accurate 3-dimensional wind velocity map over a large altitude range. This would be very useful in a number of applications. For example, it provides the ability for precise prediction of the spread of toxic chemicals from an industrial accident. It can aid in the fighting of forest fires, both in predicting where the fire may spread, and in the airborne application of fire retardants. Other uses will be readily recognized by those skilled in the art.

Referring back to FIG. 3, for each measurement point in given volume, there is associated with it two LOS's and an angle $\phi$. A measurement perpendicular to the projection of the wind velocity vector along each LOC is then obtained. In U.S. Pat. No. 5,796,471, a similar technique is described. However, the present invention over comes two of the shortcomings associated with that invention. The first is that the Doppler measurements along the two LOS's were stated to be vector components of the wind velocity. Secondly, in that patent reference, each LOS was used to establish a different coordinate system.

The fundamental error is that the perpendicular projection of the wind velocity vector on the two LOS's are not, in general, the components of a vector. The only time they are, is when $\phi$ is exactly equal to 90°. Secondly, since the so called vector components were in different coordinate systems, they cannot be used to determine the wind velocity vector until one of the coordinate systems has been transformed into the other through an orthogonal transformation. But this requires that the perpendicular projections are vectors, which they are not.

The following discussion follows that of E. A. Guillemin, *The Mathematics of Circuit Analysis*, Chap. III, Article 5, MIT Press, John Wiley & Sons (1949), with the tensor calculus portion taken from J. McConnel, *Application of Tensor Analysis*, Chap. III, Dover (1957). The fundamental mathematical concept that must be kept in mind in order to follow the discussion is that vectors add according to the parallelogram law.

Figure 4:
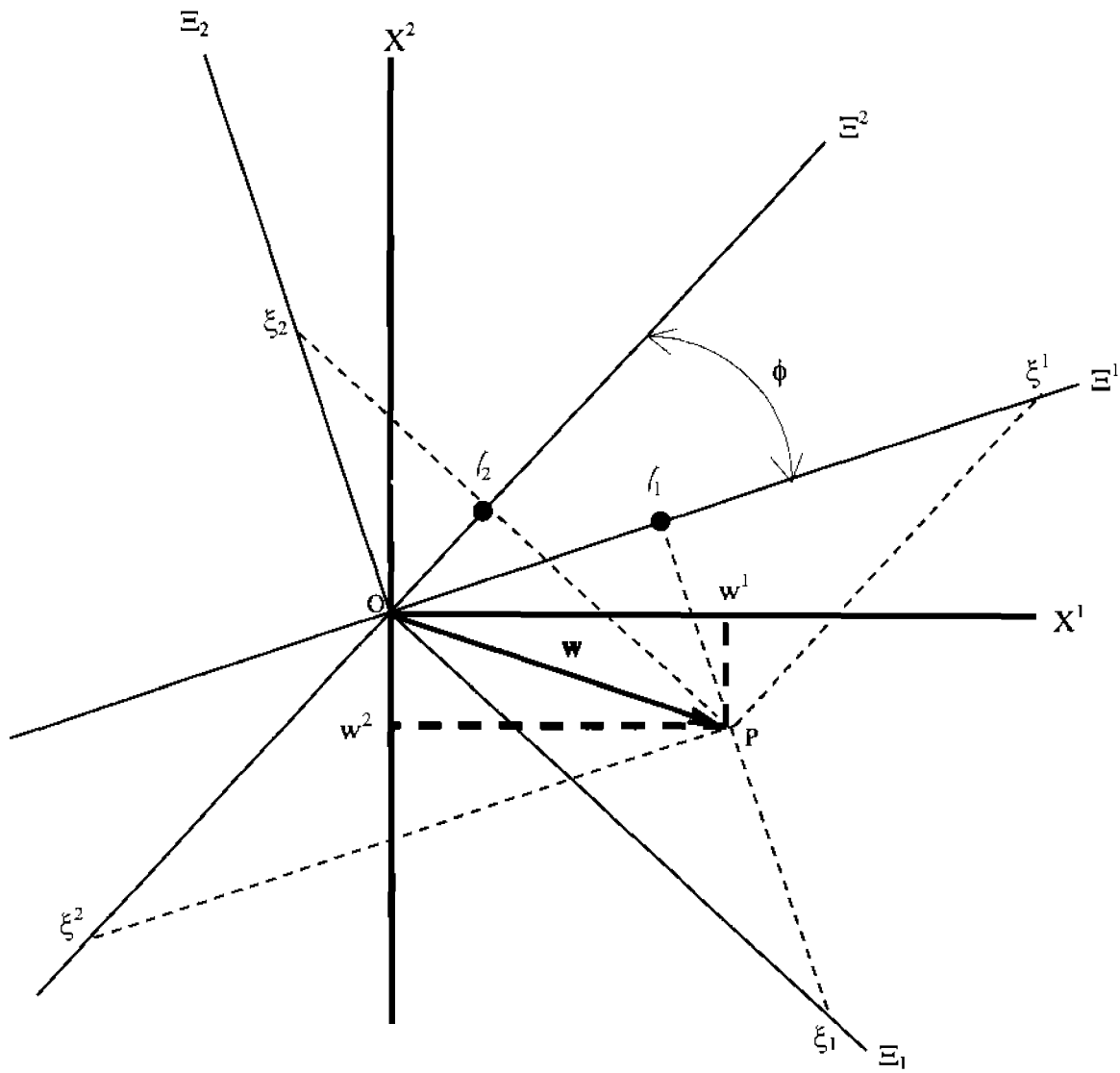
FIG. 4 is a graph illustrating the relationships between an orthogonal and oblique coordinate systems and the associated components of the wind vector, w; the orthogonal system is illustrated in heavy weight black lines with the $X^1$-axis representing East; and the $X^2$-axis, North; the vector components on these axes are $w^1$ and $w^2$; the lighter weight lines illustrate the oblique coordinate systems.
Figure 5:
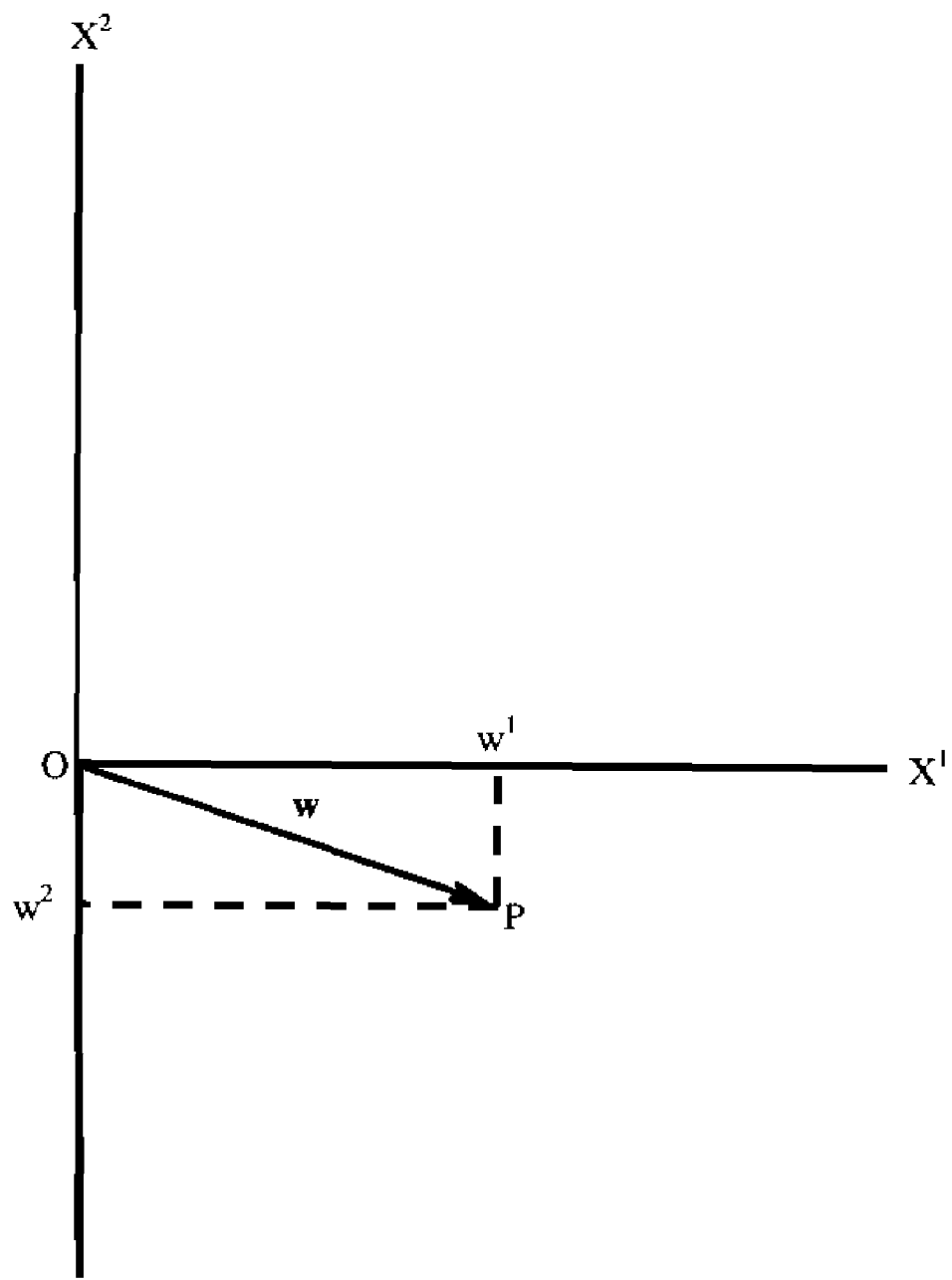
FIG. 5 is a graph illustrating a wind vector, w, with vector components $w^1$ and $w^2$ in the Cartesian coordinate system $X^1$-$X^2$; O is the origin of the coordinate system, and P is the point in space at which the wind velocity is being measured; P designates the end of the wind vector.
Figure 6:
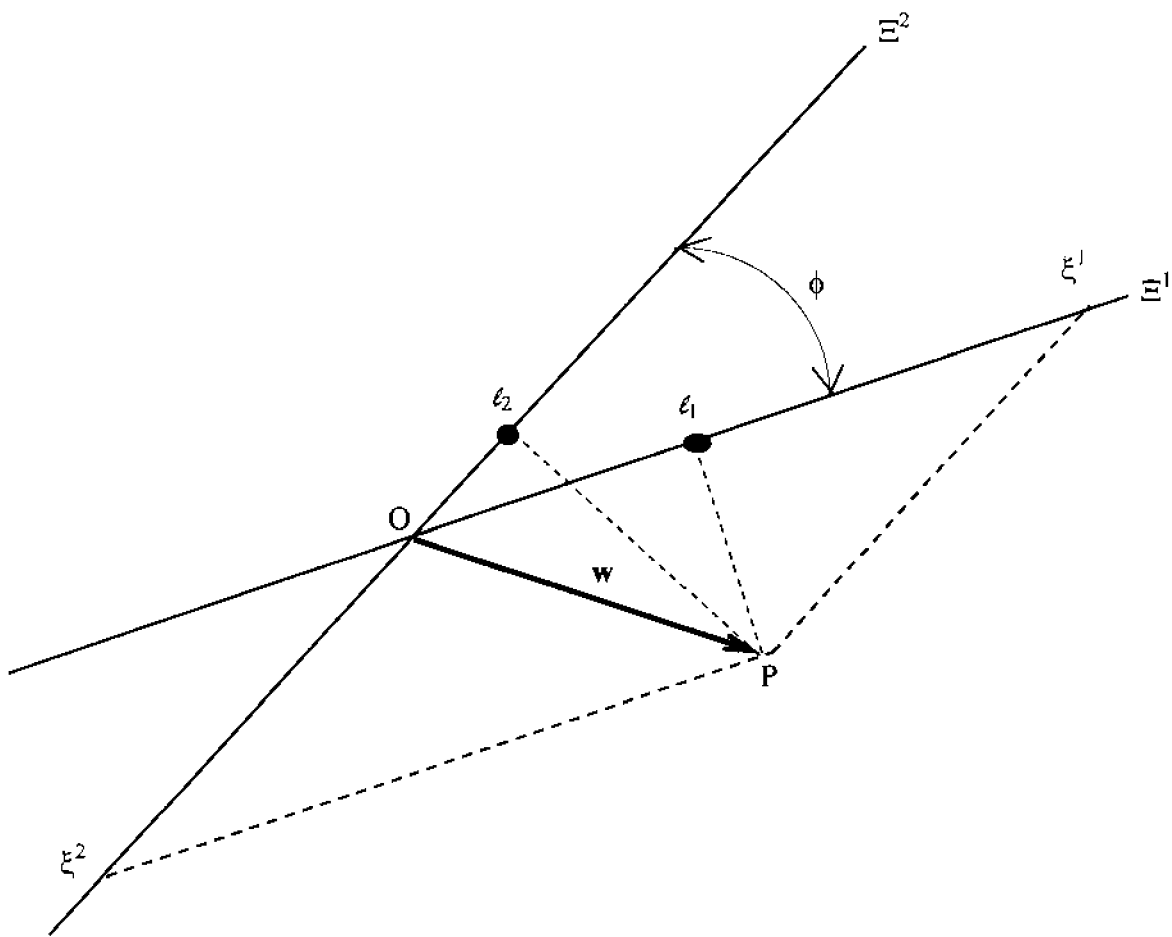
FIG. 6 is a graph illustrating a contravariant, oblique coordinate system $\Xi_1$-$\Xi_2$; the perpendicular projections of the wind vector onto the $\Xi_1$ and $\Xi_2$ axes are the points $\lambda_1$ and $\lambda_2$; these points are values of the velocity measured by the Doppler system, but are not the vector components of the wind vector in this coordinate system; the vector components of w in this oblique coordinate system are given by the points $\xi_1$ and $\xi_2$; in this graph, the scale of length in this coordinate system is identical to Cartesian coordinate system illustrated in FIG. 5.

In FIG. 4, three different coordinate systems, with a common origin, are superimposed. The first is an Earth fixed rectangular Cartesian coordinate system. The second is an oblique coordinate system defined by the two LOS's established at times $t_1$ and $t_2$. The third is a coordinate system that is reciprocal to the LOS coordinate system. These three coordinate systems are shown individually in FIGS. 5, 6, and 7.

In an orthogonal coordinate system, a length scale is chosen. Given the coordinates of any vector, its length can be determined by application of the Pythagorean theorem, i.e., the square of the length is equal to the sum of the squares of the coordinate vectors. This simple formula no longer holds for an oblique coordinate system. At this point it is necessary that one distinguish between the contravariant and covariant components of a vector, and utilize the notation of tensor analysis. The x, y, z axes are labeled by the index numbers 1, 2, 3. The contravariant components of a vector, as well as the axes to which these components refer are indicated by a superscripted index. Similarly, the covariant components and axes are indicated with subscripted indices.

FIG. 4 shows the three fundamental coordinate systems. The rectangular Cartesian coordinate system is shown in thick black lines, with the x-axis labeled $X^1$, and the y-axis labeled $X^2$. The components of the wind vector, w, in this coordinate system are $w^1$ and $w^2$ respectively. The origin of the coordinate systems is the point in space in which the wind velocity is being measured, and is labeled O. The wind, w, vector is the thick arrow whose tail is at O and the tip of the arrow is at P. Its vector components are given by the coordinate vectors, $w^1$ and $w^2$. The Cartesian coordinate system by itself is reproduced in FIG. 5.

The axes of the oblique coordinate systems are labeled with the letter $\Xi$, and the components of w in these coordinate systems are labeled by the lower case $\xi$. The oblique axes, in which the velocity measurements are made, are coincident with the two LOS's of FIG. 3. They form the contravariant coordinate axis and labeled $\Xi^1$ and $\Xi^2$, with the angle $\phi$ between them. One establishes a scale of length in this coordinate system that is identical to that in the Cartesian system, i.e., a unit length represents a unit wind speed. These axes are shown in FIG. 4, and reproduced in FIG. 6.

The components of the wind vector in these axes are given by $\xi^1$ and $\xi^2$. Note that the projections from the wind vector tip are made parallel to the coordinate axes. Applying the parallelogram law of vector addition, we see that the addition of the two vectors $O\xi^1 + \xi^1 P$ do indeed result in w, since $\xi^1 P$ is equal to $O\xi^2$.

The LADAR does not measure the components $\xi^1$ and $\xi^2$ which are needed to determine the velocity vector. Instead, it measures the perpendicular projections of the wind vector, w, onto the $\Xi^1$ and $\Xi^2$ axes. These projections are indicated by the heavy black dots, and are labeled $\lambda_1$ and $\lambda_2$. It is clear in FIG. 6 that the vectors $O\,I_1$ and $O\,I_2$ cannot add up to the wind vector w.

Figure 7:
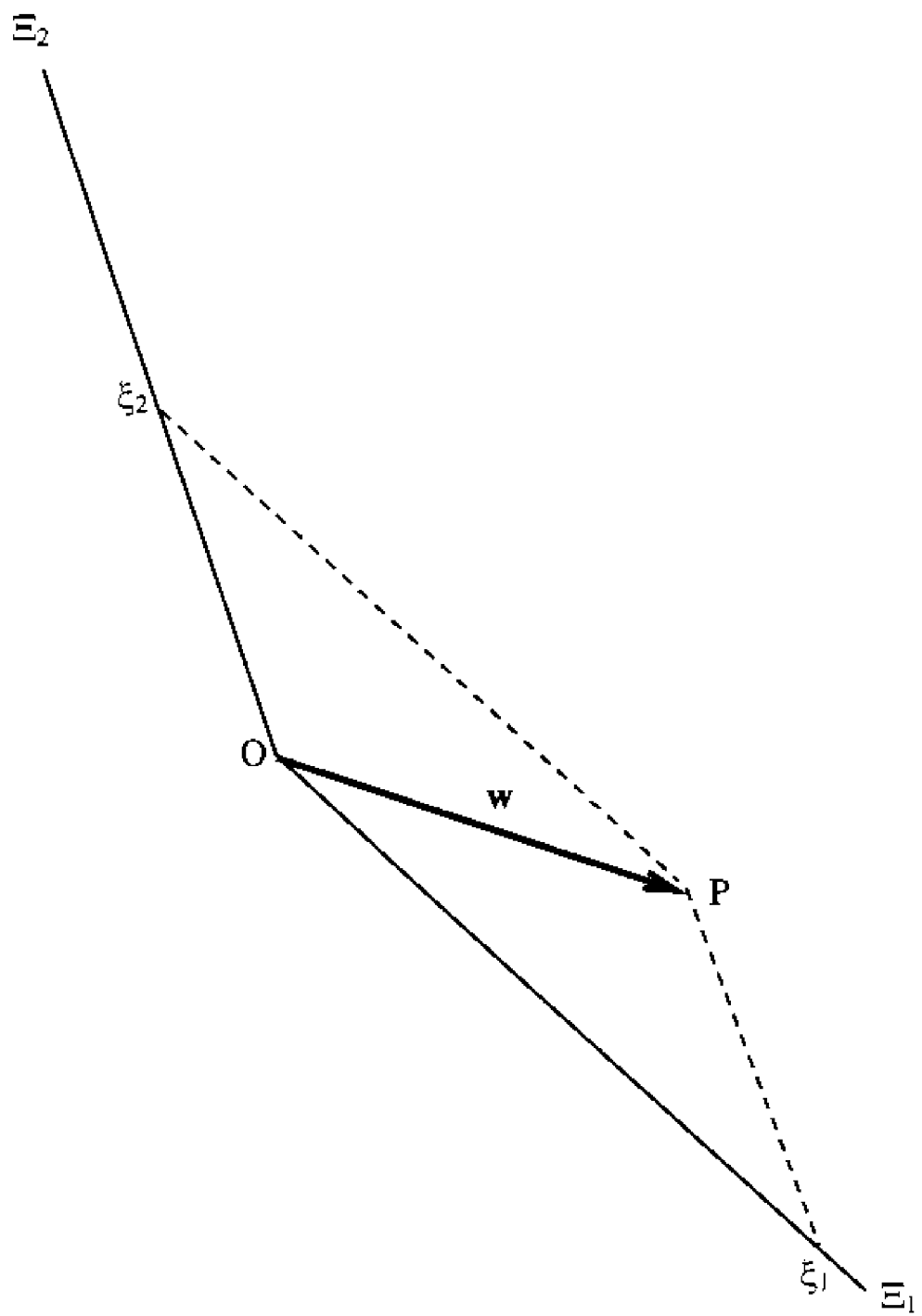
FIG. 7 is a graph illustrating a covariant, oblique coordinate system, which is the reciprocal of the coordinate system in FIG. 6; the vector components of w are $\xi_1$ and $\xi_2$; the scale of length in this coordinate system is different than the scale for FIGS. 5 and 6; the numerical values, but not the scale, of $\lambda_1$ and $\lambda_2$ are equal to $\xi_1$ and $\xi_2$ respectively.

If one can find the vector components of w in any one coordinate system, then one can determine the vector component in all coordinate systems through orthogonal transformations. One can determine a set of vector components by establishing a second oblique coordinate system, called a reciprocal system. Its 1-axis is established by making it perpendicular to the 2-axis of the first system, and its 2-axis is perpendicular to the 1-axis of the first system. The axes and vector components in this system are indicated by subscripts, and the vector components are called the covariant components. The scale of length in this system is not equal to the scale of length in the other two systems. The covariant components of the wind vector in the reciprocal system are labeled $\xi_1$ and $\xi_2$ and are established by using the parallelogram law of vector addition, as illustrated in FIG. 7.

When two coordinate systems have a reciprocal relationship, then it can be shown that the magnitude, but not the scale, of a vector component in one system is equal to the perpendicular protection in the other system. Thus, $I_1$ and $I_2$ on the contravariant axes are numerically equal to $\xi_1$ and $\xi_2$ on the covariant axes.

Since one now knows the covariant components of the wind vector, one can calculate the magnitude of w. To calculate the length of a vector in these oblique systems, it is first necessary to determine the fundamental metric tensor. The contravariant metric tensor is designated as $g^{ij}$, and the covariant metric tensor as $g_{ij}$. Then the square of the length of a vector, v, in any coordinate system is given by:

$$|v|^2 = g^{ij} v_i v_j = v_i v^i = g_{ij} v^i v^j = v^i v_i \tag{5}$$

where the Einstein convention of summing on repeated indices is used, and the indices take on the values 1, 2, and 3.

It can be shown that if the contravariant system has a scale of length equal to that of the orthogonal system, then $$g_{11} = g_{22} = 1 \tag{6a}$$

$$g_{12} = g_{21} = \cos\phi \tag{6b}$$

The tensor $g^{ij}$ is the inverse matrix of $g_{ij}$, therefore its components are given by $$g^{11} = g^{22} = 1/\sin^2\phi \tag{7a}$$

$$g^{12} = g^{21} = -\cos\phi/\sin^2\phi \tag{7b}$$

The previous discussion brings to light the subtleties associated with oblique coordinate systems, and that the vector components in these systems cannot be treated in the familiar way that they are treated in orthogonal Cartesian coordinate systems. In an operation sense, the simplest way to determine the wind velocity vector would be to directly transform the measured velocity values into their corresponding Cartesian coordinate components, and then perform all subsequent mathematical operations in the orthogonal system. This can be done in the following way.

Again referring to the 2-dimensional case, one knows the angle $\phi$ between the two LOS's, and the angle that each LOS makes with each Cartesian coordinate axis. Referring to FIG. 4, let the angle that $\Xi^1$ makes with $X^1$ be $\theta_1$ and the angle that $\Xi^2$ makes with $X^1$ be $\theta_2$. One can now construct the transformation matrix, A, from the X-components of the wind vector into contravariant $\Xi$-components of the wind vector by using the standard methods of linear algebra.

First define a unit vector, $u^1$ in the $\Xi^1$ axis. The first row of the matrix A consists of the vector components of $u^1$ onto the $X^1$ and the $X^2$ axes. These are $[\cos\theta_1, \sin\theta_1]$ and form the first row of the matrix A. Similarly, the unit vector $u^2$ on the $\Xi^2$-axis has components $[\cos\theta_2, \sin\theta_2]$, which forms the second row of the matrix A. Providing the angle, $\phi$, is non-zero, the matrix A is nonsingular. Therefore, A has an inverse, $A^{-1}$. It is known from the study of linear algebra, that the covariant components of a vector can transformed back into the Cartesian coordinate system by multiplying these components by the reciprocal matrix of A. But the reciprocal of a matrix is simply the transpose of the inverse of a matrix. Representing the reciprocal of a matrix with superscript asterisk, and the transpose of a matrix with a subscript t, one has $$A^* = A^{-1}_t \tag{8}$$

Since the numbers $\lambda_1$ and $\lambda_2$ are known to be equal, in magnitude, to the covariant components of w, multiply $[l_1$ and $l_2]$ by $A^*$ and get the following result:

$$w_1 = \frac{\sin\theta_2}{\sin\phi} l_1 - \frac{\sin\theta_1}{\sin\phi} l_2 \tag{9a}$$

$$w_2 = -\frac{\cos\theta_2}{\sin\phi} l_1 + \frac{\cos\theta_1}{\sin\phi} l_2 \tag{9b}$$

The extension to three dimensions follows.

The fixed difference, dual beam laser velocimetry technique of the invention falls into the category in which the stable reference is provided by some device other than the laser. In this case it is a stable, radio frequency oscillator. The degree of stability required is dependent on the range over which the measurement will be made. A simple crystal oscillator is sufficient over a range of tens of meters to several hundred meters. A temperature controlled crystal oscillator is useful over ranges of thousands of kilometers, and atomic clocks can allow useful ranges of millions of kilometers.

Two beams, with a fixed relationship, simultaneously sampling a target, has the information content for executing a variety of functions. For high level signals at the photodetector, video detection results in an output of the detector that is the Doppler shifted reference frequency. For very weak signals at the threshold of detection, optical heterodyne detection can be implemented using a laser source other than the transmitter laser. The output of the photodetector must then be followed by a squaring device in order to produce the Doppler shifted reference frequency.

The ability to separate the photodetection process from the Doppler measurement process leads to a simplification of the total system. It is possible to use optical heterodyne detection with multiple receivers and only one transmitter beam. This allows a simpler and more economical method determining the velocity vector in a flow field. This also permits coherent detection with all the remote receivers. This is possible because the frequencies for the RF local oscillators at each receiver can be derived from the same frequency standard as that driving the acoustical wave in the Bragg cell.

Finally, a method for measuring the velocity components at a point using two non-collinear LOS's, or in 3-dimensions, three non-coplanar LOS's, has been developed. The fixed difference, dual beam technique can implement this method in an economical and robust manner. It can easily be implemented as a stationary system to monitor the winds at a location such as an airport to detect microburst activity. It can be implemented as a portable system for measuring the winds at any location, as required. It is small enough and light enough that it could even be mounted in a single engine light aircraft. It obviously can be applied to almost all applications in which laser velocimetry has been used.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A fixed difference, dual beam receiver, comprising:
   optics configured to receive and concentrate laser energy backscattered from a target to provide an incoming laser beam;
   a beam combining element configured to co-align the incoming laser beam and a laser local oscillator (LO) beam;
   one or more apparatuses for mixing the incoming laser beam and a laser local oscillator (LO) beam on a surface of a photodetector and to generate difference frequencies;
   one or more acoustical signal generating apparatuses configured to receive and process the difference frequencies to produce an acoustical signal in which an amplitude of a Doppler shifted acoustical frequency determined from the difference frequencies is multiplied by a function of an amplitude of the laser LO beam; and
   a frequency modulation (FM) receiver configured to receive and process the acoustical signal to generate a demodulator output signal.

2. The fixed difference, dual beam receiver of claim 1 wherein the incoming laser beam and a laser local oscillator (LO) beam have substantially the same polarization.

3. The fixed difference, dual beam receiver of claim 1 wherein the one or more acoustical signal generating apparatuses comprises a square law apparatus and the function of an amplitude of the laser LO beam is the amplitude of the laser LO beam squared.

4. The fixed difference, dual beam receiver of claim 1 wherein the FM receiver is configured to use a non-laser, stable frequency reference as a local oscillator input.

5. The fixed difference, dual beam receiver of claim 1 wherein the one or more apparatuses for mixing the incoming laser beam and a LO beam comprises at least a portion of the photodetector.

6. A photon noise-limited, long-range, laser Doppler velocimeter utilizing a fixed difference, dual beam velocimeter comprising:
   a transmitter; and
   a receiver, said receiver comprising a laser operating as a local oscillator, and optics that combine and co-align a beam from said local oscillator with a fixed difference, dual beam backscattered from a target; and
   said receiver further comprising a photodetector comprising a surface onto which said local oscillator beam and said fixed difference, dual beam backscattered from a target are combined and directed so as to produce electrical signals representing backscattered Doppler shifted transmitter beams.

7. The velocimeter of claim 6 wherein said transmitter comprises:
   a stable radio-frequency reference providing a reference frequency;
   a single mode laser source providing a probe laser beam to a target whose velocity is being measured;
   an acousto-optic apparatus for splitting said probe laser beam into a fixed difference, dual beam, said dual beam comprising frequencies which differ by a fixed acoustical frequency, said acoustical frequency derived from said reference frequency; and
   an optical system directing said fixed difference, dual beam to the target.

8. The velocimeter of claim 6 wherein said receiver further comprises:
   a stable radio frequency reference providing a reference frequency said stable radio frequency reference providing a fixed acoustical frequency; and wherein said laser operating as a local oscillator comprises a single mode laser source;
   a square law device squaring said electrical signals produced by said photodetector an output of said square law device comprising an output signal which is a Doppler shifted, acoustical frequency multiplied by a squared amplitude of said local oscillator beam; and
   electronic circuitry which provides the target velocity component along the optical axis of the receiver based on the difference of said Doppler-shifted, acoustical frequency and said fixed acoustical frequency provided by said stable radio frequency reference.

9. The velocimeter of claim 6 wherein said transmitter and said receiver are provided within a single unit.

10. The velocimeter of claim 9 wherein said transmitter and said receiver share a single stable radio frequency reference.

11. The velocimeter of claim 6 wherein a sample of a laser source of said transmitter is used as said laser local oscillator of said receiver.

12. The velocimeter of claim 7 wherein said stable radio frequency reference comprises an element selected from the group consisting of a crystal oscillator, an oven-controlled crystal oscillator, an atomic clock, and a Global Positioning System time.

13. The velocimeter of claim 8 wherein said stable radio frequency reference comprises an element selected from the group consisting of a crystal oscillator, an oven-controlled crystal oscillator, an atomic clock, and a Global Positioning System time.

14. The velocimeter of claim 8 wherein said square law device comprises a diode element operating in its square law region and a band-pass filter centered on said fixed acoustic frequency.

15. The velocimeter of claim 8 wherein said square law device comprises a multiplier circuit followed by a band pass filter centered on said fixed acoustic frequency.

16. The velocimeter of claim 8 wherein the acoustical frequency derived from the two received backscattered, Doppler-shifted, fixed difference, dual beam is compared with the acoustical frequency generated by said stable frequency reference using a filter comprising a sharp cutoff.

17. The velocimeter of claim 8 wherein said FM receiver produces an output voltage that is proportional to the difference between said Doppler-shifted acoustical frequency and said acoustical frequency provided by said stable frequency.

18. The velocimeter of claim 8 comprising a plurality of said receivers in different locations to receive said backscattered, Doppler-shifted, fixed difference dual beam.

19. The velocimeter of claim 18 wherein each of said plurality of receivers measures a different component of a target velocity vector.

* * * * *